W. J. HERRICK.
CLUTCH.
APPLICATION FILED MAY 21, 1909. RENEWED FEB. 14, 1912.
1,043,932.
Patented Nov. 12, 1912.
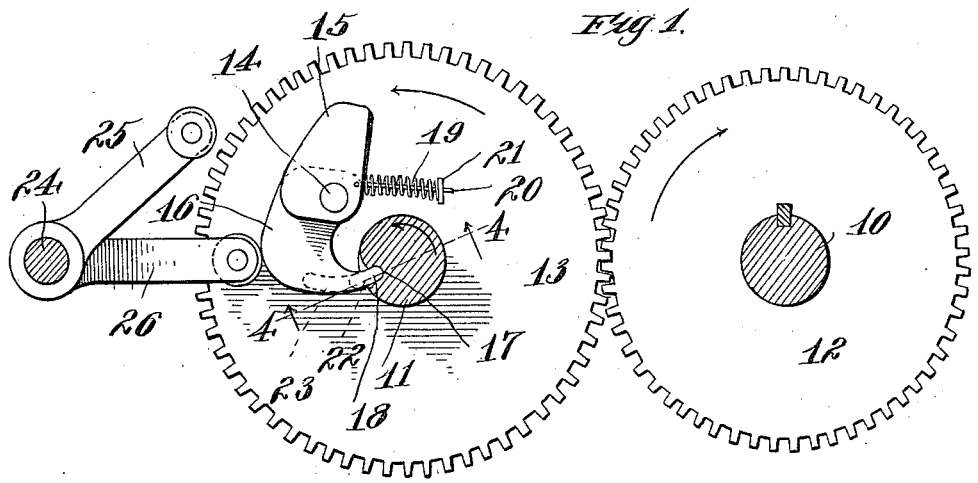
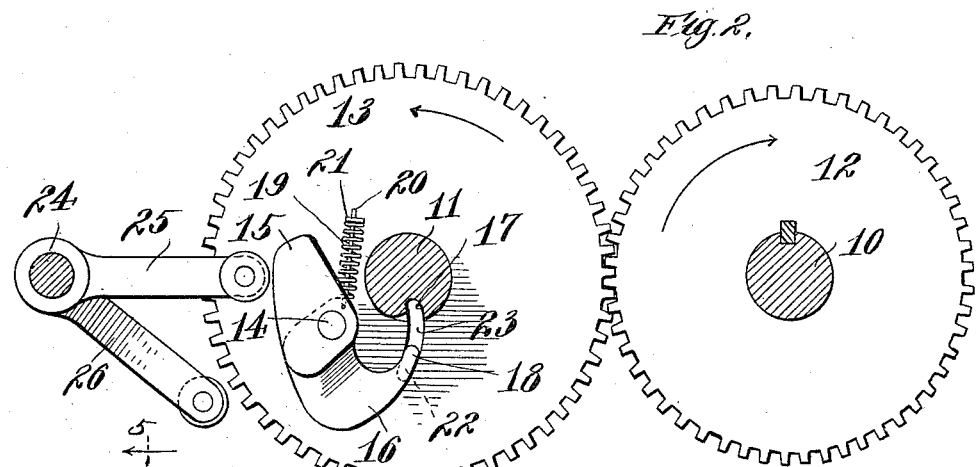
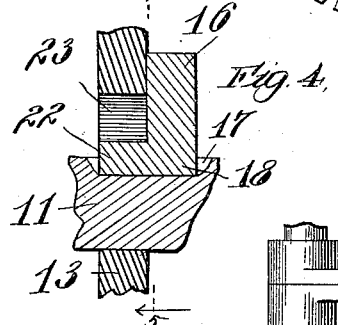
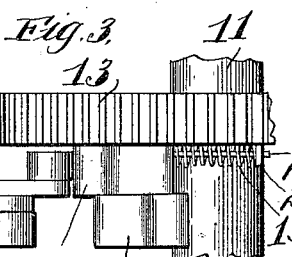
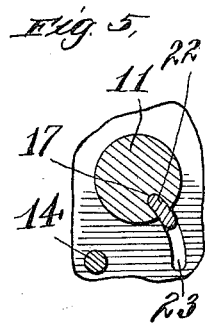

UNITED STATES PATENT OFFICE.

WILLIAM J. HERRICK, OF CHICAGO, ILLINOIS.

CLUTCH.

1,043,932.  Specification of Letters Patent.  Patented Nov. 12, 1912.

Original application filed April 2, 1909, Serial No. 487,401. Divided and this application filed May 21, 1909, Serial No. 497,438. Renewed February 14, 1912. Serial No. 677,467.

*To all whom it may concern:*

Be it known that I, WILLIAM J. HERRICK, a citizen of the United States, residing at Chicago, in the county of Cook and State of Illinois, have invented certain new and useful Improvements in Clutches, of which the following is a specification, reference being had therein to the accompanying drawing.

The present invention relates to clutches, and consists in the novel arrangements and organizations of parts now about to be described and as pointed out in the appended claims.

The invention is capable of extended and general use but for the purpose of illustrating a practical exemplification of it I have shown it in the present illustration embodied in a mechanism for transmitting motive power from any prime motor or source of power to machines such for example as motor vehicles, launches or other devices wherein it is desired that the driven part may be propelled in the same or in a reverse direction to that of the driving part and at different speeds, which mechanism is shown and claimed in my co-pending application bearing Serial No. 487,401 filed April 2, 1909 of which the present application is a division.

In the accompanying drawings:—Figure 1 is a side elevation of the clutch showing the latch in operative position; Fig. 2 is a similar view showing the latch in inoperative position; Fig. 3 is a plan view of parts as shown in Fig. 1; Fig. 4 is a detail sectional view on the line 4—4 of Fig. 1, and Fig. 5 is a detail sectional view on the line 5—5 of Fig. 4.

In carrying out my invention in the embodiment shown I support a pair of parallel shafts 10 and 11 in suitable bearings (not shown), the shaft 10 being driven in the direction of the arrow by any suitable motor. On the shaft 10 I rigidly mount a gear 12 meshing with a gear 13 loose upon the shaft 11. The gear and shaft 11 are adapted to be coupled through the medium of a latch which is pivoted to the gear 13 at 14 and which consists of a pair of oppositely extending wings 15 and 16 which are offset or arranged in different vertical planes, the wing 15 being the uncoupling wing as it is suitably tripped to disengage the latch from the shaft while the wing 16 is the coupling wing as it is tripped to throw the latch into engagement with the shaft. The shaft is provided with a suitable keyway 17 adapted to receive the key 18 of the latch when the latter is thrown to coupling position. An expansion spring 19 coiled about a rod 20 reacts between the latch and a shoulder 21 on the gear 13, and is so located that when the latch is either coupled or uncoupled it occupies a position at one side of the pivot 14 whereby its expansive force holds the latch in its coupled or uncoupled position and prevents its accidental movement from such position.

In order to cause the latch to act on the principle of a key or spline between its gear 13 and the shaft 11, I extend the keyway 17 of the shaft to a point more or less within the area of the gear and provide the latch with a lateral projection or toe 22 forming a key-portion in this extension as shown in Fig. 4, the gear being cut away at the shaft sufficiently to provide a recess 23 into which the toe 22 projects when the latch is in the key-way and into which it is retracted to allow it to clear the shaft when the latch is uncoupled or unlatched. By this means the latch acts as a key or spline to engage the shaft and gear, the strain being taken by the toe of the latch and the force or strain of the driving member being delivered directly upon the driven member and so removed from the body of the latch itself and its pivot.

Any suitable means are provided for automatically projecting and retracting the latch into and out of engagement with the key-way of the shaft. In the present embodiment a rod 24 is mounted in suitable bearings (not shown) and may be operated by any suitable means and is provided with a pair of projections preferably in the form of rigid radial arms 25 and 26 provided with anti-friction rollers at their ends and lying in the respective planes of the wings 15 and 16. By this arrangement when the arm 26 is thrown into the path of its wing 16 it will cam or force the latch to coupling position as shown in Fig. 1, and when the arm 25 is thrown to position in the path of its associated wing 15 it raises the latch out of engagement with the shaft as shown in Fig. 2, the spring 19 holding the latch in either of these positions, and the toe 22 acting as a key or spline when the latch is coupled to the shaft as clearly shown in Figs. 4 and 5.

Having described my invention, I claim:

1. In a device of the class described, a shaft having a groove, a member loose on the shaft and having a recess registering with the groove at each revolution of the member on the shaft, a latch pivoted on the member and movable toward and away from the shaft and having a toe extending into the recess, and means to operate the latch to cause the toe to engage the groove and recess.

2. In a device of the class described, a shaft having a key-way, a gear loose on the shaft and having a recess registering with the key-way at each revolution of the gear on the shaft, a latch pivoted on the gear and movable toward and away from the shaft and having a key in the recess, and means to move the latch to cause the key to also engage the key-way.

3. In a device of the class described, a shaft having a groove, a member loose on the shaft and having a recess registering with the groove at each revolution of the member on the shaft, a latch pivoted on the member and movable toward and away from the shaft and having a toe extending into the recess, and a trip to cause the latch to engage and disengage the groove.

4. In a device of a class described, a shaft having a key-way, a gear loose on the shaft and having a recess registering with the key-way at each revolution of the gear on the shaft, a latch pivoted on the gear and movable toward and away from the shaft and having a key in the recess, and a trip to move the latch to cause the key to engage and disengage the key-way.

5. In a device of the class described, a driving element and a driven element concentric with each other, the elements having openings or slots registering with each other at each revolution of the driven element, a latch pivoted on one of the elements and movable toward and away from the other and having a key in the slot or opening of said elements provided with a toe, and means to move the latch to also engage the toe with the slot or opening of the other element.

6. In a device of the class described, a shaft having a key-way, a gear loose on the shaft, means to drive the gear, a latch pivoted on the gear and having wings in different planes, and a trip to alternately trip the wings to couple and uncouple the latch and shaft.

7. In a device of the class described, a shaft having a key-way, a gear loose on the shaft and having a recess registering with the key-way at each revolution of the gear on the shaft, means to drive the gear, a latch pivoted on the gear having a key provided with a toe, wings on the latch in different planes, and a trip to alternately trip the wings to couple and uncouple the toe and key-way.

8. In a clutch, the combination with a driving member and a driven member having a key-way, of a pivoted latch carried by the driving member and having a pair of wings, and a trip adapted to coöperate with the wings in alternation to couple and uncouple the clutch.

9. In a clutch, the combination with a driving member and a driven member having a key-way, of a coupling latch pivoted on the driving member and having a pair of oppositely extending wings moving in parallel planes, and a trip adapted to be moved into the paths of the wings in alternation and be engaged thereby to rock the latch on its pivot.

10. In a clutch, the combination with a driving member and a driven member having a key-way, of a coupling latch pivoted on the driving member and having oppositely extending wings fixed thereto and arranged at right angles to the pivot and moving in parallel planes, a trip adapted to be moved into the planes of rotation of the wings in alternation, and a spring to hold the latch in both its coupled and uncoupled positions.

11. In a clutch, the combination with a driving member and a driven member having a key-way, a latch pivoted on the driving member and having a key provided with a toe to engage the key-way to couple the members, a pair of wings extending in opposite directions from the pivot of the latch and traveling in parallel paths, and a movable trip adapted to be moved into position to be engaged by the wings in alternation to move the latch into and out of engagement with the key-way.

12. In a clutch, the combination with a driving member and a driven member having a key-way, a coupling latch pivoted on the driving member and having a pair of oppositely extending wings rotating in parallel planes and adapted to be moved outwardly in alternation on the pivot as the clutch is coupled or uncoupled, and a pair of tripping arms movable into position to be respectively engaged by a wing when in its outer position to rock the latch on its pivot.

13. In a clutch, the combination with a driving member and a driven member, a coupling latch pivoted on the driving member and having a pair of oppositely extending wings rigid therewith and moving in parallel planes and adapted to be moved inwardly and outwardly on the pivot in alternation as the clutch is coupled or uncoupled, a rod pivoted to the latch, a shoulder on the driving member and having an eye through which the other end of the rod extends, an expansion spring coiled about the rod and acting to hold the latch in its coupled and uncoupled positions, a pair of arms adapted to be moved into position to be respectively engaged by a wing in its outer position to rock the latch on its pivot, and a rock shaft for the arms.

In testimony whereof I affix my signature in presence of two witnesses.

WILLIAM J. HERRICK.

Witnesses:
GEORGE R. HARBAUGH,
J. McROBERTS.

Copies of this patent may be obtained for five cents each, by addressing the "Commissioner of Patents, Washington, D. C."